(12) United States Patent
Kang et al.

(10) Patent No.: US 8,088,703 B2
(45) Date of Patent: Jan. 3, 2012

(54) DIELECTRIC COMPOSITION AND CERAMIC ELECTRONIC COMPONENT MANUFACTURED THEREFROM

(75) Inventors: Sung Hyung Kang, Gyeonggi-do (KR); Young Tae Kim, Gyeonggi-do (KR); Kang Heon Hur, Gyeonggi-do (KR); Jeong Oh Hong, Seoul (KR); Su Jin Kim, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 26 days.

(21) Appl. No.: 12/239,288

(22) Filed: Sep. 26, 2008

(65) Prior Publication Data

US 2010/0022382 A1    Jan. 28, 2010

(30) Foreign Application Priority Data

Jul. 25, 2008    (KR) .................. 10-2008-0072558

(51) Int. Cl.
  *C04B 35/468*    (2006.01)
(52) U.S. Cl. ....................................... 501/139
(58) Field of Classification Search .................. 501/137, 501/138, 139
  See application file for complete search history.

(56) References Cited

U.S. PATENT DOCUMENTS

| | | | |
|---|---|---|---|
| 6,344,427 B1 * | 2/2002 | Komatsu et al. | 501/138 |
| 6,949,487 B2 * | 9/2005 | Ito et al. | 501/137 |
| 7,042,707 B2 * | 5/2006 | Umeda et al. | 361/321.2 |
| 7,061,748 B2 | 6/2006 | Ito et al. | |
| 7,147,835 B2 * | 12/2006 | Seo et al. | 423/598 |
| 7,696,118 B2 | 4/2010 | Kojima et al. | |
| 2008/0115876 A1 * | 5/2008 | Komatsu et al. | 156/89.14 |

FOREIGN PATENT DOCUMENTS

| | | |
|---|---|---|
| JP | 2002-308671 A | 10/2002 |
| JP | 2007-22819 | 2/2007 |
| KR | 10-2000-0037541 A | 7/2000 |
| KR | 10-2006-0046512 A | 5/2006 |
| KR | 10-2006-0050839 A | 5/2006 |
| KR | 10-2007-0118557 A | 12/2007 |
| WO | 2006104026 | * 10/2006 |

\* cited by examiner

*Primary Examiner* — Karl Group
(74) *Attorney, Agent, or Firm* — McDermott Will & Emery LLP

(57) ABSTRACT

Provided are a dielectric composition and a ceramic electronic component including the same. The dielectric composition includes (a) barium titanate having a specific surface area of 2.5 m2/g to 6.0 m2/g; (b) a mixture containing at least one or more materials selected from the group consisting of any one oxide of Mg, Ca, Sr, Ba and Zr, and any one carbonate thereof; (c) oxide containing at least one or more materials selected from the group consisting of Sc, Y, La, Ac, Ce, Pr, Nd, Pm, Sm, Eu, Gd, Tb, Dy, Ho, Er, Tm, Yb, and Lu; (d) oxide containing at least one or more material selected from the group consisting of Cr, Mn, Fe, Co, and Ni; (e) oxide containing at least one or more material selected from the group consisting of V, Nb, and Ta; and (f) oxide containing at least one or more material selected from the group consisting of Si and Al. The dielectric composition can satisfy X8R characteristic, can be sintered at a low temperature, and can obtain high reliability.

7 Claims, 1 Drawing Sheet

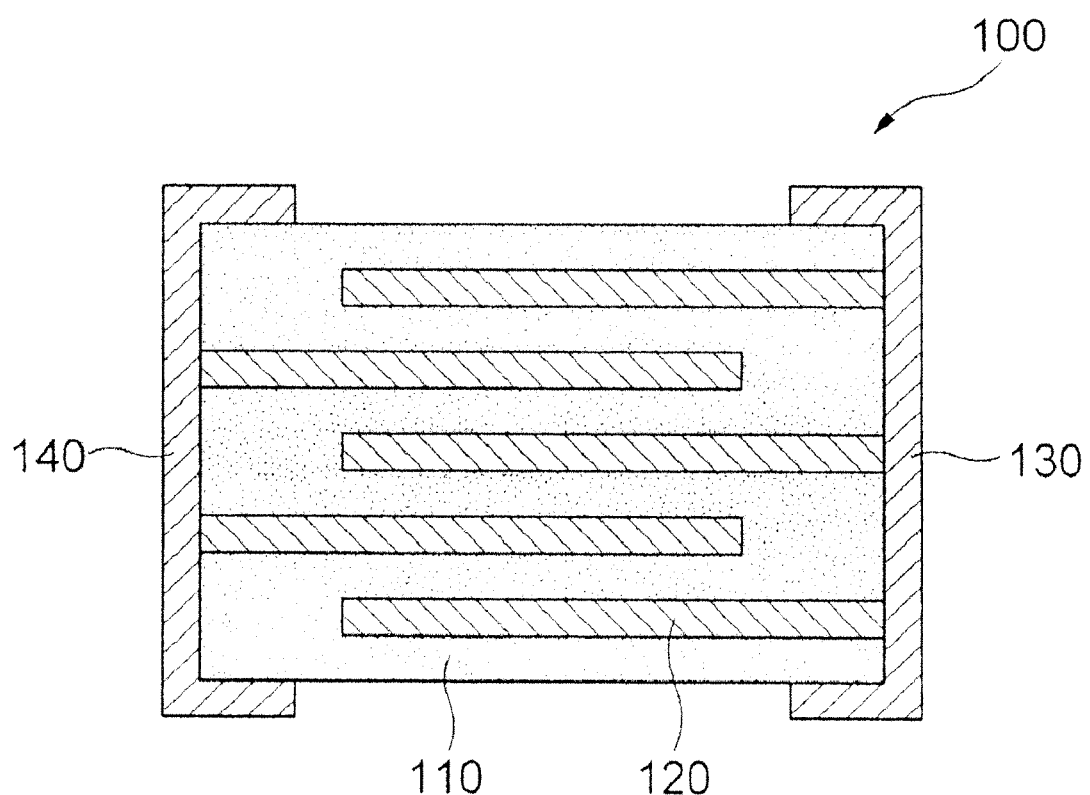
FIGURE

DIELECTRIC COMPOSITION AND CERAMIC ELECTRONIC COMPONENT MANUFACTURED THEREFROM

CROSS-REFERENCE TO RELATED APPLICATIONS

This application claims the benefit of Korean Patent Application No. 10-2008-0072558 filed with the Korea Intellectual Property Office on Jul. 25, 2008, the disclosure of which is incorporated herein by reference.

BACKGROUND OF THE INVENTION

1. Field of the Invention

The present invention relates to a dielectric composition and a ceramic electronic component manufactured therefrom, and more particularly, to a dielectric composition and a ceramic electronic component manufactured therefrom, which can satisfy X8R characteristic and reduce a sintering temperature by limiting a specific surface area of a main component and controlling a composition and content of the dielectric composition.

2. Description of the Related Art

Today, electronic and electric industries are in progress toward high integration, miniaturization, and lightweight. Thus, high capacity and miniaturization are intensively required in multi-layer ceramic capacitors (MLCC) which are applied to electronic and electric industries.

MLCCs are used as electronic components of vehicles. For example, MLCCs are applicable to electronic devices such as engine electronic control unit (ECU) mounted inside an engine room of a vehicle, a crank angle sensor, or an anti-lock brake system (ABS) module. The electronic devices of the vehicle may be exposed to harsh environments, for example, a temperature ranging from −20° C. to 130° C. Furthermore, as the electronic devices of the vehicle are often disposed outside, they may be exposed to much harsher environments. Therefore, the electronic devices of the vehicle require higher heat resistance and reliability than those applied to other industry fields. Thus, the MLCCs included in the electronic devices must maintain reliability in a wide temperature range environment and must provide high capacity.

To manufacture the MLCCs, many studies have been conducted to obtain dielectric materials that satisfy a wide temperature range, for example, X8R characteristic of EIA standard, and have high dielectric constant. The X8R characteristic means that the capacitance is varied within ±15% in a temperature ranging from −55° C. to 150° C.

For example, Japanese Patent Laid-open Publication No. 2007-22819 discloses a dielectric material which includes barium titanate as a main component, sintering additives containing silicon oxide as a main component, an auxiliary component containing one material of $BaZrO_3$, $SrZrO_3$, and $MgZrO_3$, and other auxiliary components. Such a dielectric material can satisfy X8R characteristic, can improve IR temperature dependency, and can be sintered under a reduction atmosphere.

However, since the dielectric material has a high sintering temperature more than 1260° C., it is difficult to manufacture a high-capacity MLCC. The high-capacity MLCC includes an Ni internal electrode between dielectric layers. Therefore, if the dielectric layer and the Ni internal electrode are simultaneously sintered at a high temperature more than 1260° C., the Ni internal electrode may be shorted by contraction and aggregation of the Ni internal electrode. Therefore, there is a limitation in forming the Ni internal electrode layer with a small thickness, and it is difficult to manufacture a high-capacity MLCC through highly stacked layers.

As the conventional electronic devices are exposed to harsh environments, dielectric materials satisfying the X8R characteristic have been developed. However, since the dielectric materials have a high sintering temperature, there is a limitation in manufacturing high-capacity electronic components.

SUMMARY OF THE INVENTION

An advantage of the present invention is that it provides a dielectric composition and a ceramic electronic component manufactured therefrom, which can satisfy X8R characteristic and reduce a sintering temperature by limiting a specific surface area of a main component and controlling a composition and content of the dielectric composition.

Additional aspect and advantages of the present general inventive concept will be set forth in part in the description which follows and, in part, will be obvious from the description, or may be learned by practice of the general inventive concept.

According to an aspect of the invention, a dielectric composition includes: (a) barium titanate having a specific surface area of 2.5 $m^2/g$ to 6.0 $m^2/g$; (b) a mixture containing at least one or more materials selected from the group consisting of any one oxide of Mg, Ca, Sr, Ba and Zr, and any one carbonate thereof; (c) oxide containing at least one or more materials selected from the group consisting of Sc, Y, La, Ac, Ce, Pr, Nd, Pm, Sm, Eu, Gd, Tb, Dy, Ho, Er, Tm, Yb, and Lu; (d) oxide containing at least one or more material selected from the group consisting of Cr, Mn, Fe, Co, and Ni; (e) oxide containing at least one or more material selected from the group consisting of V, Nb, and Ta; and (f) oxide containing at least one or more material selected from the group consisting of Si and Al.

The barium titanate may be expressed as $Ba_mTiO_3$, where $0.995 \leq m \leq 1.010$.

The content of the (b) component may be 3 mol to 10 mol relative to 100 mol of the (a) component; the content of the (c) component may be 1 mol to 9 mol relative to 100 mol of the (a) component; the content of the (d) component may be 0.01 mol to 1 mol relative to 100 mol of the (a) component; the content of the (e) component may be 0.01 mol to 1 mol relative to 100 mol of the (a) component; and the content of the (f) component may be 1.5 mol to 5 mol relative to 100 mol of the (a) component.

A value of [((total number of moles of the (b) component)−(number of moles of the Zr oxide))/(number of moles of the (f) component)] may be in a range of 1 to 1.5.

A value of [(number of moles of the (c) component)/(number of moles of the (f) component)] may be in a range of 1.5 to 3.

A specific surface area of a mixture containing the (b) component, the (c) component, the (d) component, the (e) component, and the (f) component may be in a range of 5.0 $m^2/g$ to 100 $m^2/g$.

The dielectric composition may further include (g) Li oxide, wherein the content of the (g) component may be 0.01 mol to 0.6 mol relative to 100 mol of the (a) component.

A specific surface area of a mixture containing the (b) component, the (c) component, the (d) component, the (e) component, the (f) component, and the (g) component may be in a range of 5.0 $m^2/g$ to 100 $m^2/g$.

The (b) component and the (e) component may have a single oxide form.

According to another aspect of the invention, a ceramic electronic component includes a dielectric layer manufactured from the dielectric component.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

The FIGURE is a sectional view of a stacked ceramic condenser according to an embodiment of the present invention.

DETAILED DESCRIPTION OF THE PREFERRED EMBODIMENTS

Hereinafter, preferred embodiments of the present invention will be described in detail with reference to the accompanying drawings. Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

The FIGURE is a sectional view of an MLCC according to an embodiment of the present invention.

Referring to the FIGURE, the MLCC includes a dielectric layer 110 and an internal electrode 120 which are alternately stacked. In addition, the MLCC further includes first and second external electrodes 130 and 140, which are disposed on both ends of the dielectric layer 110 and the internal electrode 120, respectively, and are connected to the end portion of the internal electrode 120.

The dielectric layer 110 may be formed of a dielectric composition which satisfies X8R characteristic and can be sintered at a low temperature.

The dielectric composition may include an (a) component as a main component, and (b) to (f) components as additives.

The (a) component may be barium titanate having a specific surface area of 2.5 m$^2$/g to 6.0 m$^2$/g. When the specific surface area is less than 2.5 m$^2$/g, a sintering temperature increases and a high-temperature reliability is degraded. On the other hand, when the specific surface area is more than 6.0 m$^2$/g, a dielectric constant decreases.

The barium titanate may be expressed as Ba$_m$TiO$_3$, where $0.995 \leq m \leq 1.010$. When m is less than 0.995, the barium titanate may be easily reduced under a reduction atmosphere sintering and changed into a semiconductor material. When m is more than 1.010, a sintering temperature may increase.

The (b) component serves to provide a reduction inhibition, a grain growth control, and a sintering stability. In addition, the (b) component serves to stabilize the dielectric characteristics.

The (b) component may include oxides of at least one or more materials selected from the group consisting of Mg, Ca, Sr, Ba, and Zr. The oxides may have a single oxide form. For example, the oxide of Ba may be BaO. In addition, the (b) component may include carbonates of at least one or more materials selected from the group consisting of Mg, Ca, Sr, Ba, and Zr. For example, the carbonate of Ba may be BaCO$_3$.

The (b) component may consist of a single material, or include a mixture of at least two or more materials. In case where the (b) component includes a mixture of at least two or more materials, it may include different kinds of oxides or different kinds of carbonates. In addition, the (b) component may include a mixture of oxide and carbonate.

The content of the (b) component may be 3 mol to 10 mol relative to 100 mol of the (a) component. When the (b) component contains two or more kinds of materials, the content of the (b) component may be equal to the sum of the two or more kinds of materials. At this point, when the content of the (b) component is less than 3 mol, the dielectric composition is easily reduced by sintering under a reduction atmosphere, so that the grain growth control becomes difficult. On the other hand, when the content of the (b) component is more than 10 mol, the sintering temperature of the dielectric composition rapidly increases and the dielectric constant decreases.

The (c) component serves to improve a high-temperature accelerated lifetime and stabilize capacitance variation at more than a Curie temperature (Tc). The Curier temperature (Tc) is a temperature that has the maximum dielectric constant at a temperature range at which a phase transition occurs, that is, a phase changes from a tetragonal phase to a cubic phase. That is, the (c) component serves to satisfy the X8R characteristic.

The (c) component may be a rare-earth oxide. For example, the (c) component may include at least one or more oxides of material selected from the group consisting of Sc, Y, La, Ac, Ce, Pr, Nd, Pm, Sm, Eu, Gd, Tb, Dy, Ho, Er, Tm, Yb, and Lu.

The content of the (c) component may be 1 mol to 9 mol relative to 100 mol of the (a) component. When the content of the (c) component is less than 1 mol, the high-temperature accelerated lifetime may be reduced. In addition, the dielectric constant variation rate according to temperature is unstable, and the reliability of the ceramic electronic components including the dielectric layer may be degraded. On the other hand, when the content of the (c) component is more than 9 mol, the sintering temperature increases, and the dielectric constant decreases.

The (d) component can serve to increase the insulation resistance (IR) and improve the high-temperature accelerated lifetime. The (d) component may be oxides of at least one or more materials selected from the group consisting of Cr, Mn, Fe, Co, and Ni.

The content of the (d) component may be 0.01 mol to 1 mol relative to 100 mol of the (a) component. When the content of the (d) component is less than 0.01 mol, the high-temperature accelerated lifetime is reduced, and the variation rate of the dielectric constant according to temperature is unstable. On the other hand, when the content of the (d) component is more than 1 mol, the product (CR product) of the dielectric constant and the insulation resistance is lowered.

The (e) component serves to improve the high-temperature accelerated lifetime together with the (c) component and stabilize the capacitance variation at more than the Curie temperature (Tc). The (e) component may be oxides of at least one or more materials selected from the group consisting of V, Nb, and Ta.

The content of the (e) component may be 0.01 mol to 1 mol relative to 100 mol of the (a) component. When the content of the (e) component is less than 0.01 mol, the high-temperature accelerated lifetime is reduced. On the other hand, when the content of the (e) component is more than 1 mol, the CR product is lowered.

The (f) component serves as sintering additives. That is, the (f) component reacts with the (a) component or the (b) component to provide the sintering characteristic of the dielectric composition. The (f) component may be oxides of at least one or more material selected from the group consisting of Si and Al. The (f) component may have a single oxide form in order to prevent the segregation problem and the degradation of reliability.

The content of the (f) component may be 1.5 mol to 5 mol relative to 100 mol of the (a) component. When the content of the (f) component is less than 1.5 mol, the sintering temperature increases. On the other hand, when the content of the (f) component is more than 5 mol, the grain growth control is difficult.

In addition, when the (b) component contains Zr oxide, a mole ratio of [((total number of moles of the (b) component)−(number of moles of the Zr oxide))/(number of moles of the (f) component)] is in a range of 1 to 1.5. When the mole ratio is less than 1, the sintering temperature is decreased, while the high-temperature accelerated lifetime is reduced and the sintering temperature is unstable. On the other hand, when the mole ratio is more than 1.5, the sintering temperature increases.

In addition, a mole ratio of [(number of moles of the (c) component)/(number of moles of the (f) component)] may have a range of 1.5 to 3. When the mole ratio is less than 1.5, the grain growth control is difficult and the high-temperature accelerated lifetime is reduced. Furthermore, the sintering temperature becomes unstable. On the other hand, when the mole ratio is more than 3 mol, the sintering temperature increases.

Moreover, the specific surface area of the mixture containing the (b) component, the (c) component, the (d) component, the (e) component, and the (f) component may have a range of 5.0 $m^2/g$ to 100 $m^2/g$. Therefore, the reaction between the (a) component and the mixture can be improved during the sintering process of the dielectric composition. In this way, the sintering temperature of the dielectric composition can be reduced and the dielectric characteristics can be improved. However, when the specific surface area is more than 100 $m^2/g$, the reliability can be improved, but the capacitance may be decreased.

In addition, the dielectric composition may further include a (g) component which can decrease the sintering temperature. For example, the (g) component may be Li oxide.

The content of the (g) component may be 0.01 mol to 0.6 mol relative to 100 mol of the (a) component. The (g) component may not be included in the dielectric composition. However, when the content of the (g) component is more than 0.01 mol, the sintering temperature can be decreased. However, when the content of the (g) component is more than 0.6 mol, the sintering temperature is further decreased, but the reliability is degraded. In addition, Li of the (g) component is volatilized and thus the dielectric composition may be sintered ununiformly. Micro cracks may occur due to stress generated inside during the sintering of the dielectric composition.

In order to improve the reaction between the (a) component and the mixture, the specific surface area of the mixture containing the (b) component, the (c) component, the (d) component, the (e) component, the (f) component, and the (g) component may have a range of 5.0 $m^2/g$ to 100 $m^2/g$.

The internal electrode 120 may be formed of a conductive material. For example, the conductive material may be a single layer of Cu, W, and Mo, or an alloy of at least two materials thereof. In addition, the conductive material may be one of In—Ga, Ag, Ag-10pd, carbon, graphite, and a mixture of carbon and graphite. The material of the internal electrode 120 is not limited to the above materials. The internal electrode 120 may be formed of Ni or Ni alloy. The Ni alloy may be an alloy of one or more of Ni, Mn, Cr, Cl, and Al.

The Ni or Ni alloy is cheaper than other conductive materials, and can be used for high-capacity electronic components. However, when the Ni or Ni alloy and the dielectric composition are sintered at a high sintering temperature of more than 1260° C., the Ni internal electrode may be shorted by the contraction and aggregation phenomenon of the Ni internal electrode. However, the dielectric composition forming the dielectric layer 110 can be sintered at less than 1260° C., it is possible to prevent the Ni internal electrode from being shorted by the contraction and aggregation phenomenon of the Ni internal electrode. Furthermore, the dielectric composition has a reduction inhibition characteristic, that is, the dielectric composition is not reduced even though it is sintered under a reduction atmosphere. Therefore, the internal electrode 120 may be formed of at least one of the Ni and Ni alloy, and thus, the high-capacity MLCC 100 can be manufactured.

The first and second external electrodes 130 and 140 may be formed of a conductive material. For example, the conductive material may be a single layer of Cu, W, Ni, and Mo, or an alloy of at least two materials thereof. In addition, the conductive material may be one of In—Ga, Ag, Ag-10pd, carbon, graphite, and a mixture of carbon and graphite. The materials of the first and second external electrodes 130 and 140 are not limited to the current embodiment of the present invention.

Therefore, the sintering temperature of the dielectric composition can be decreased by adjusting the specific surface area, the component, and the content of the materials contained in the dielectric composition. In addition, it is possible to form the dielectric layer that satisfies the X8R characteristic and has the excellent dielectric characteristics. Furthermore, in the ceramic electronic components including the dielectric layers, the high-temperature reliability, the CR product, and the high-temperature accelerated lifetime can be improved.

Although it has been described above that the dielectric composition is used as the dielectric layer of the MLCC, the present invention is not limited to the embodiment of the present invention. For example, the dielectric composition can also be used to manufacture dielectrics of ceramic electronic components such as a piezoelectric device, a chip inductor, a chip varistor, and a chip resistor.

Hereinafter, the present invention will be described in more detail with reference to an experimental example. However, the present invention is not limited to the following experimental example.

Experimental Example

A dielectric composition was prepared as listed in Table 1 below. Using zirconia ball as a mixture and dispersion media, the dielectric composition was dispersed into a solvent together with a dispersant. A mixture of ethanol and toluene was used as the solvent. Thereafter, the dispersed dielectric composition and a binder were mixed to form a slurry. Thereafter, a ceramic sheet is manufactured by coating and drying the slurry on a substrate by using a doctor blade. Thereafter, an internal electrode was formed by printing Ni on the ceramic sheet.

The above-described processes were performed twenty times to form a stacked structure where the ceramic sheet and the internal electrode were stacked in twenty layers. Thereafter, the stacked structure was pressed and cut to form samples.

The sample was preliminarily fired in order to remove the binder, and then fired at a temperature of 1220° C. to 1330° C. under a reduction atmosphere. The fired sample is heated at a temperature of 1000° C. in order for re-oxidation. Thereafter, a termination process was performed on the sample to form an external electrode connected to the internal electrode of the sample.

TABLE 1

| Sample No. | Specific surface area of (a) component (m²/g) | (b) component | (c) component | (d) component | (e) component | (f) component | First mole ratio | Second mole ratio |
|---|---|---|---|---|---|---|---|---|
| | | Mole of component per 100 mol of (a) component | | | | | | |
| Experimental example 1 | 5.3 | 8.9 | 8.0 | 0.25 | 0.3 | 3.5 | 1.34 | 2 |
| Comparative example 1 | 1.8 | 8.9 | 8.0 | 0.25 | 0.3 | 3.5 | 1.34 | 2 |
| Experimental example 2 | 4.5 | 9.2 | 6.5 | 0.4 | 0.3 | 3.5 | 1.42 | 1.71 |
| Comparative example 2 | 3.4 | 11.7 | 7.0 | 0.35 | 0.3 | 4 | 1.65 | 1.75 |
| Comparative example 3 | 2.8 | 9.0 | 10.0 | 0.7 | 0.2 | 4.5 | 1.11 | 2.22 |
| Comparative example 4 | 5.3 | 7.4 | 8.0 | 1.1 | 0.2 | 4.5 | 1.38 | 1.78 |
| Comparative example 5 | 4.5 | 8.1 | 4.0 | 0.45 | 1.5 | 3 | 1.33 | 1.66 |
| Comparative example 6 | 4.5 | 8.0 | 9.0 | 0.35 | 0.1 | 1 | 1.45 | 1.63 |

In the above Table 1, the (b) component is a mixture of Mg oxide, Ba oxide, Ca oxide, Zr oxide, and Sr oxide. The (c) component is a mixture of Y oxide, Yb oxide, and Dy oxide. The (d) component is a mixture of Mn oxide, Cr oxide, and Mo oxide. The (e) component is a mixture of one or more of Nb oxide, Ta oxide, and V oxide. The (f) component is a mixture of Si oxide and Al oxide.

In addition, the first mole ratio is defined by [((total number of moles of the (b) component)−(number of moles of the Zr oxide))/(number of moles of the (f) component)]. The second mole ratio is defined by [(number of moles of the (c) component)/(number of moles of the (f) component)].

The dielectric constant, the dielectric constant variation rate (TCC) at 150° C., the high-temperature accelerated lifetime, the CR product, and the sintering temperature were measured with respect to the sample manufactured in the above-described method. The results were shown in Table 2 below.

In the following Table 2, the dielectric constant and the static capacitance were measured at 1 KHz and 1 V by using an LCR meter. The dielectric constant variation rate (TCC) was measured in a range of −55° C. to 150° C. The high-temperature accelerated lifetime was defined as time until the insulation resistance (IR) became less than $10^5 \Omega$ by applying 10 Vdc/μm at 150° C.

TABLE 2

| Sample No. | Dielectric constant | TCC (%) | High-temperature accelerated lifetime (Vr) | CR product | Sintering temperature (° C.) |
|---|---|---|---|---|---|
| Experimental example 1 | 1825 | −12 | 3 | 1221 | 1210 |
| Comparative example 1 | 2053 | 3 | 2 | 1561 | 1270 |
| Experimental example 2 | 1781 | −12 | 5 | 2101 | 1230 |
| Comparative example 2 | 1588 | 0 | 4 | 2311 | 1290 |
| Comparative example 3 | 1420 | 4 | 4 | 2001 | 1270 |
| Comparative example 4 | 1811 | −15 | 3 | 229 | 1260 |
| Comparative example 5 | 1701 | 6 | 1 | 182 | 1220 |
| Comparative example 6 | 2206 | −10 | 2 | 2213 | 1330 |

Referring to the above Table 2, in the case of the comparative example 1, when the specific surface area of the (a) component was less than 2.5 m²/g, the dielectric constant variation rate (TCC) at 150° C. was −12%. That is, the comparative example 1 satisfied the X8R characteristic, but the high-temperature accelerated lifetime and the sintering temperature increased. In the case of the comparative example 2, when the content of the (b) component is more than 10 mol per 100 mol of the (a) component and the first mole ratio is more than 1.5, the comparative example 2 satisfied the X8R characteristic, but the dielectric constant decreased and the sintering temperature increased.

In addition, in the case of the comparative example 3, when the content of the (c) component is more than 9 mol per 100 mol of the (a) component, the comparative example 3 satisfied the X8R characteristic, but the dielectric constant decreased and the sintering temperature increased.

In addition, in the case of the comparative example 4, when the content of the (d) component is more than 1 mol per 100 mol of the (a) component, the comparative example 4 satisfied the X8R characteristic, but the CR product was lowered.

In addition, in the case of the comparative example 5, when the content of the (e) component is more than 1 mol per 100 mol of the (a) component, the comparative example 5 satisfied the X8R characteristic, but the high-temperature accelerated lifetime and the CR product decreased.

In addition, in the case of the comparative example 6, when the content of the (f) component is less than 1.5 mol per 100 mol of the (a) component, the comparative example 6 satisfied the X8R characteristic, but the high-temperature accelerated lifetime and the sintering temperature increased.

Meanwhile, the experimental examples 1 and 2 using the dielectric composition according to the embodiment of the present invention satisfied the X8R characteristic and can be sintered at a temperature less than 1260° C. under a reduction atmosphere. In addition, since the dielectric composition had the dielectric constant of more than 1700, the dielectric layer had excellent dielectric characteristics and the capacitance was varied within ±15% in a temperature ranging from −55° C. to 150° C.

According to the embodiment of the present invention, in the dielectric composition for the dielectric layer, the sintering temperature can be decreased to below 1260° C. by limiting the specific surface area of the main component and controlling the composition and content of the dielectric composition. Therefore, since the internal electrode can be formed using a cheap material such as Ni or the like, the high-capacity ceramic electronic components can be manufactured at a low cost.

In addition, the dielectric composition can satisfy the X8R characteristic, can be sintered under the reduction atmosphere, and can provide the excellent dielectric characteristics.

Furthermore, the ceramic electronic components manufactured using the dielectric composition can improve the high-temperature accelerated lifetime and the CR product and can ensure the excellent reliability.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A dielectric composition comprising:
   (a) barium titanate having a specific surface area of 2.5 m$^2$/g to 6.0 m$^2$/g;
   (b) a mixture containing at least one or more materials selected from the group consisting of any one oxide of Ca, Sr, Ba and Zr, and any one carbonate thereof;
   (c) oxide containing at least one or more materials selected from the group consisting of Sc, Y, La, Ac, Ce, Pr, Nd, Pm, Sm, Eu, Gd, Tb, Tm, Yb, and Lu;
   (d) oxide containing at least one or more material selected from the group consisting of Cr, Fe, Co, and Ni;
   (e) oxide containing at least one or more material selected from the group consisting of Nb and Ta; and
   (f) oxide containing at least one or more material selected from the group consisting of Si and Al,
   wherein a value of [((total number of moles of the (b) component)−(number of moles of the Zr oxide))/(number of moles of the (f) component)] is in a range of 1 to 1.5, and wherein a value of [(number of moles of the (c) component)/(number of moles of the (f) component)] is in a range of 1.5 to 3.

2. The dielectric composition according to claim 1, wherein the barium titanate is expressed as Ba$_m$TiO$_3$, where 0.995≦m<0.999.

3. The dielectric composition according to claim 1, wherein a specific surface area of a mixture containing the (b) component, the (c) component, the (d) component, the (e) component, and the (f) component is in a range of 5.0 m$^2$/g to 100 m$^2$/g.

4. The dielectric composition according to claim 1, further comprising:
   (g) Li oxide, wherein the content of the (g) component is 0.01 mol to 0.6 mol relative to 100 mol of the (a) component.

5. The dielectric composition according to claim 4, wherein a specific surface area of a mixture containing the (b) component, the (c) component, the (d) component, the (e) component, the (f) component, and the (g) component is in a range of 5.0 m$^2$/g to 100 m$^2$/g.

6. The dielectric composition according to claim 1, wherein the (b) component and the (e) component have a single oxide form.

7. A dielectric composition comprising:
   (a) barium titanate having a specific surface area of 2.5 m$^2$/g to 6.0 m$^2$/g;
   (b) a mixture containing at least one or more materials selected from the group consisting of any one oxide of Ca, Sr, Ba and Zr, and any one carbonate thereof;
   (c) oxide containing at least one or more materials selected from the group consisting of Sc, Y, La, Ac, Ce, Pr, Nd, Pm, Sm, Eu, Gd, Tb, Tm, Yb, and Lu;
   (d) oxide containing at least one or more material selected from the group consisting of Cr, Fe, Co, and Ni;
   (e) oxide containing at least one or more material selected from the group consisting of Nb and Ta; and
   (f) oxide containing at least one or more material selected from the group consisting of Si and Al,
   wherein a value of [((total number of moles of the (b) component)−(number of moles of the Zr oxide))/(number of moles of the (f) component)] is in a range of 1 to 1.5, and
   wherein a value of [(number of moles of the (c) component)/(number of moles of the (f) component)] is in a range of 1.5 to 3,
   wherein the content of the (b) component is 3 mol to 10 mol relative to 100 mol of the (a) component;
   the content of the (c) component is 3.2 mol to 9 mol relative to 100 mol of the (a) component;
   the content of the (d) component is 0.01 mol to 1 mol relative to 100 mol of the (a) component;
   the content of the (e) component is 0.01 mol to 1 mol relative to 100 mol of the (a) component; and
   the content of the (f) component is 1.5 mol to 5 mol relative to 100 mol of the (a) component.

* * * * *